United States Patent
Kauhanen et al.

(10) Patent No.: US 7,343,153 B1
(45) Date of Patent: Mar. 11, 2008

(54) CONTROL OF A MULTICALL IN A TELECOMMUNICATIONS SYSTEM

(75) Inventors: Timo Kauhanen, Kirkkonummi (FI); Pekka Ruuska, Oulu (FI); Tommi Kokkola, Espoo (FI); Juha Kurkilahti, Piispanristi (FI); Kimmo Laakkonen, Salo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/600,083

(22) PCT Filed: Nov. 3, 1999

(86) PCT No.: PCT/FI99/00917

§ 371 (c)(1),
(2), (4) Date: Sep. 13, 2000

(87) PCT Pub. No.: WO00/27154

PCT Pub. Date: May 11, 2000

(30) Foreign Application Priority Data

Nov. 4, 1998 (FI) .................................... 982391

(51) Int. Cl.
*H04M 3/42* (2006.01)
(52) U.S. Cl. ............... 455/416; 455/422.1; 455/426.1; 455/450
(58) Field of Classification Search ............... 455/422, 455/426, 436, 438, 450, 452, 422.1, 426.1, 455/452.1, 416, 453, 509; 370/329, 341, 370/437, 431, 462, 432
See application file for complete search history.

(56) References Cited

U.S. PATENT DOCUMENTS

| | | | | |
|---|---|---|---|---|
| 4,430,734 A | * | 2/1984 | Hubbard | 370/535 |
| 4,757,493 A | * | 7/1988 | Yuen et al. | 370/263 |
| 5,369,692 A | * | 11/1994 | Nowicki | 379/171 |
| 5,371,898 A | * | 12/1994 | Grube et al. | 455/426.1 |
| 5,625,879 A | * | 4/1997 | Tuulos | 455/509 |
| 5,819,171 A | * | 10/1998 | Hoogerwerf et al. | 455/410 |
| 5,852,781 A | * | 12/1998 | Ahvenainen | 455/509 |
| 6,115,602 A | * | 9/2000 | Dee et al. | 455/406 |
| 6,144,647 A | * | 11/2000 | Lopez-Torres | |
| 6,212,389 B1 | * | 4/2001 | Fapojuwo | 455/453 |
| 6,314,292 B1 | * | 11/2001 | Ho et al. | 455/450 |
| 6,608,820 B1 | * | 8/2003 | Bradshaw, Jr. | 455/416 |

FOREIGN PATENT DOCUMENTS

| | | |
|---|---|---|
| EP | 814 626 | 12/1997 |
| WO | WO 98/06225 | 2/1998 |
| WO | WO 98/20693 | 5/1998 |
| WO | WO 99/53704 | 10/1999 |

* cited by examiner

*Primary Examiner*—Joseph Feild
*Assistant Examiner*—Huy D. Nguyen
(74) *Attorney, Agent, or Firm*—Pillsbury Winthrop Shaw Pittman LLP

(57) ABSTRACT

A telecommunications system comprising an arrangement for controlling a multicall over a transmission path between a telecommunications network and a subscriber terminal. A multicall may have three different bearer configurations: each call of the multicall has a dedicated bearer, or one bearer is shared by all calls of the multicall, or the multicall has both dedicated and shared bearers. When a shared bearer is used, a user can have several independent calls in parallel, which have to alternate in using the bearer, or in some situations, use it simultaneously. The network is arranged to set up any new call in an existing multicall, according to a criterion, either by (i) setting up said new call on a new bearer, or (ii) setting up said new call on an existing bearer so that said existing bearer is shared by at least two calls.

28 Claims, 2 Drawing Sheets

CONTROL OF A MULTICALL IN A TELECOMMUNICATIONS SYSTEM

This application is the national phase of international application PCT/FI99/00917 filed Nov. 3, 1999 which designated the U.S.

FIELD OF THE INVENTION

The invention relates to a call control of a multicall in telecommunication systems, particularly in wireless telecommunications systems.

BACKGROUND OF THE INVENTION

A wireless communications system generally refers to any telecommunications system which enables a wireless communication between the users and the network. In mobile communications systems users are capable of moving within the service area of the system. A typical mobile communications system is a Public Land Mobile Network (PLMN).

At present, third generation (3G) mobile systems, such as Universal Mobile Communication System (UMTS) and Future Public Land Mobile Telecommunication System (FPLMTS) later renamed as IMT-2000 (International Mobile Telecommunication 2000), are being developed. The UMTS is being standardized in the ETSI (European Telecommunication Standards Institute) whereas the ITU (International Telecommunication Union) is defining the IMT-2000 system. A radio interface is likely to be based on a wideband CDMA (Code Division Multiple Access) scheme, and therefore the third generation systems are often referred to as Wideband CDMA systems (WCDMA).

It has been suggested that future 3G systems should support multiple, simultaneous and independent calls to/from a single mobile station.

A problem with the prior publications related to 3G systems is that the handling of multiple calls is only specified on a "should-be possible" level. In other words, the prior publications almost completely ignore the management details of multicalls to/from a single mobile station. In a second generation (2G) system, such as the GSM (the Global System for Mobile communication), there is one situation where a mobile station can have two calls. Such a situation may arise if a subscriber has a supplementary service (SS) called Call Hold (CH). However, a 2G mobile station does not have multiple independently-controlled bearers (i.e. traffic channels), and in a CH situation, only one call can be active while all others are put on hold. Even in the so-called high-speed data transfer (HSCSD), a mobile station uses several time slots but all the time slots are assigned to a common traffic channel.

DISCLOSURE OF THE INVENTION

For convenience, the term 'multicall' will be used to describe multiple, independent and simultaneous calls to/from a single mobile station using multiple independently-controlled traffic channels. Some of the calls can be mobile-originated (MO) calls and some can be mobile-terminated (MT) calls. An object of the invention is to provide call control mechanisms for supporting such multicalls. The user of the mobile station should be able to receive and place new calls independently of ongoing calls. Another object of the invention is to preserve at least some of the current 2G supplementary services within reasonable limits, in the 3G systems as well as to enable multicall handovers between the 2G and 3G systems.

An aspect of the invention is a method of controlling a multicall in a telecommunications system over a transmission path between a telecommunications network and a subscriber terminal, said method comprising the steps of
setting up any new call in an existing multicall, according to a criterion, either by
(i) setting up said new call on a new bearer, or
(ii) setting up said new call on an existing bearer such that said existing bearer is shared by at least two calls.

Another aspect of the invention is a telecommunications system comprising an arrangement method of controlling a multicall over a transmission path between a telecommunications network and a subscriber terminal, and in which system the network is arranged to set up any new call in an existing multicall, according to a criterion, either by
(i) setting up said new call on a new bearer, or
(ii) setting up said new call on an existing bearer such that said existing bearer is shared by at least two calls.

A further aspect of the invention is a subscriber terminal for a telecommunications system, said terminal being capable of having a multicall over a transmission path between a telecommunications network and a subscriber terminal, in which system the terminal is arranged to be able, at a setup stage of a new call in an existing multicall, to indicate whether said new call is set up on a new bearer or on an existing bearer such that said existing bearer will be shared by at least two calls.

A multicall according to the present invention may have three different bearer configurations: each call of the multicall has a dedicated bearer, or one bearer is shared by all calls of the multicall, or the multicall has both dedicated and shared bearers. When a shared bearer is used, a user can have several independent calls in parallel which have to alternate in using the bearer, or in some situations, use it simultaneously.

In an embodiment of the invention, the mobile user is able to, if network conditions or circumstances allow, to control whether a dedicated bearer mode or a shared bearer mode is used for a call, the network can not force the use of either mode. The user of a subscriber equipment may indicate at call setup whether a new dedicated bearer is needed for a new call or whether an existing bearer, and which one, shall be used and shared by one or more existing calls. According to another embodiment, the network may, in some situations, suggest, or even force, the call to use some bearer configuration. An example of this is an incoming data call, which should be offered to the user as a dedicated bearer call (Call Hold not allowed for data calls). Another example is a case when the use of multicall is limited, e.g. due to 3G-2G interworking; it saves unnecessary signaling if the network already in the setup indicates which options are available.

In an embodiment of the invention, the sharing of a common bearer is carried out by means of a call hold mode (CH): when the user puts a call on hold the traffic bearer is removed from the call to be used by other calls. As a consequence, one of the calls on that bearer is in an active mode and the other call(s) in a hold mode. In this case, if an existing bearer is selected at call setup of a new call, the call(s) which use the bearer to be shared must be put on hold before the new 'sharing' call is initiated.

In an embodiment of the invention, the user is able to toggle the call between the dedicated bearer mode and the shared bearer mode, if desired, i.e. it is possible to change the serving bearer in/during a call.

The basic principle of this invention is that the call control protocol is enhanced such that the bearer which is subjected to a call control procedure in progress, is addressed. The invention also provides means to change the associations between calls and bearers in the multicall. This enables the bearer resources to be flexibly and effectively used according to the circumstances and users' and/or networks' preferences at a given moment. For example, when one bearer and two calls are involved, one of which is active and the other on hold, the user may establish a new bearer and move the call on hold to the new bearer and vice versa. The user may also move a call from one bearer to another. Likewise, when two speech calls on two parallel bearers are involved, the subscriber may merge the calls into a conference call.

The invention also enables a third generation mobile communications system to support and interact with at least call waiting (CW), and call hold (CH), or multiparty call (MPTY) supplementary services (SS) of a 2G mobile communications system, such as the GSM.

With the introduction of a multicall in the 3G, the need for the CH and MPTY SSs diminishes, because it is possible to implement the corresponding functionality in the terminal. An advantage of implementing these functions in the terminal is the non-existent need to standardize these services, which enables the mobile terminal manufacturers to independently and flexibly develop these services and the corresponding user interface in the terminal.

It is, however, necessary to preserve the GSM SSs in 3G. Support of UMTS-GSM interworking and handovers, GSM evolution, GSM user conventions etc., are reasons for this requirement. In the case of CH and MPTY, one important reason is the capacity; instead of allocating one bearer per (peer) call party, all calls use the same bearer.

A new problem presented by this coexistence of CH/MPTY services and a multicall in the 3G system is which mode of operation the call control procedures concern. An example of this is for example given when the mobile user sets up a new call; does he or she want the new call to use an existing bearer or a new independent bearer to be allocated. This invention addresses, and solves, this problem.

The invention further enables an inter-system handover between the 2G and 3G systems.

BRIEF DESCRIPTION OF THE DRAWINGS

In the following, the invention will be described in greater detail by means of the preferred embodiments with reference to the accompanying drawings, in which.

PREFERRED EMBODIMENTS OF THE INVENTION

In the following, the preferred embodiments of the invention are described as implemented in a third generation (3G) mobile communications system, such as the UMTS system. The invention is, however, applicable to any telecommunication system.

Figure 1:
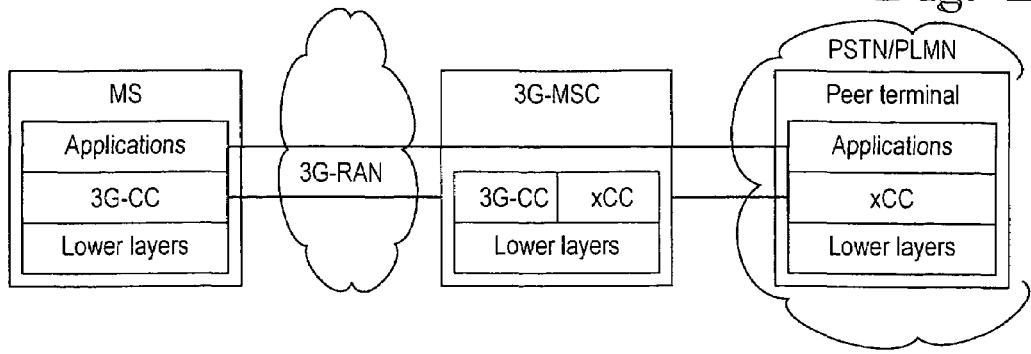
FIG. 1 shows a simplified architecture of a 3G mobile system.

FIG. 1 shows a simplified 3G architecture. The 3G mobile station MS communicates via a 3G Radio Access Network RAN with a 3G Mobile Switching Centre (3G-MSC). The 3G MSC is interworking with (an)other telecommunications network(s), such as Public Switched Telephone Network PSTN or Public Land Mobile Network PLMN.

In FIG. 1, a communication link is established between the MS and a peer terminal in the PSTN/PLMN. A simplified protocol layer structure is also shown in order to facilitate the description of the present invention. The highest protocol layer is between the applications in the MS and the peer terminal. Any number of speech and/or data calls may exist between the applications. The call control protocol (CC) is one of the protocols of the Connection Management (CM) sublayer. The CM is the highest sublayer of Layer 3 in the 3G and 2G systems. The elementary procedures of the call control protocol may be grouped into the following classes: call establishment procedures, call clearing procedures, call information phase procedures and miscellaneous procedures. In FIG. 1, the call control protocol employed between the MS and the 3G-MSC is referred to as a 3G-CC, and the call control protocol employed between the 3G-MSC and the peer terminal is referred to as an xCC. The lower layers include at least the transport layer and the transport layer control protocols.

Figure 2A:
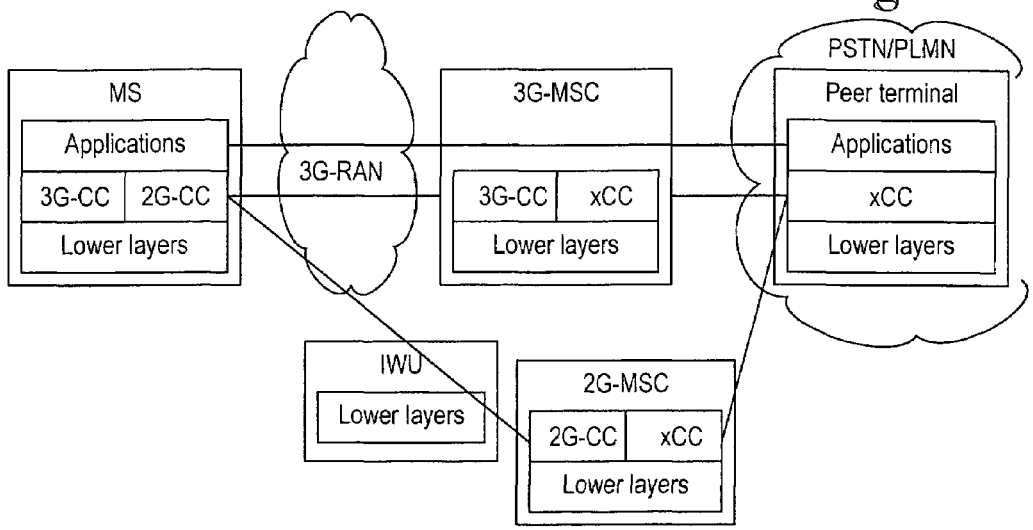
FIGS. 2A and 2B illustrate different architectures allowing interworking of 2G and 3G mobile systems.
Figure 2B:
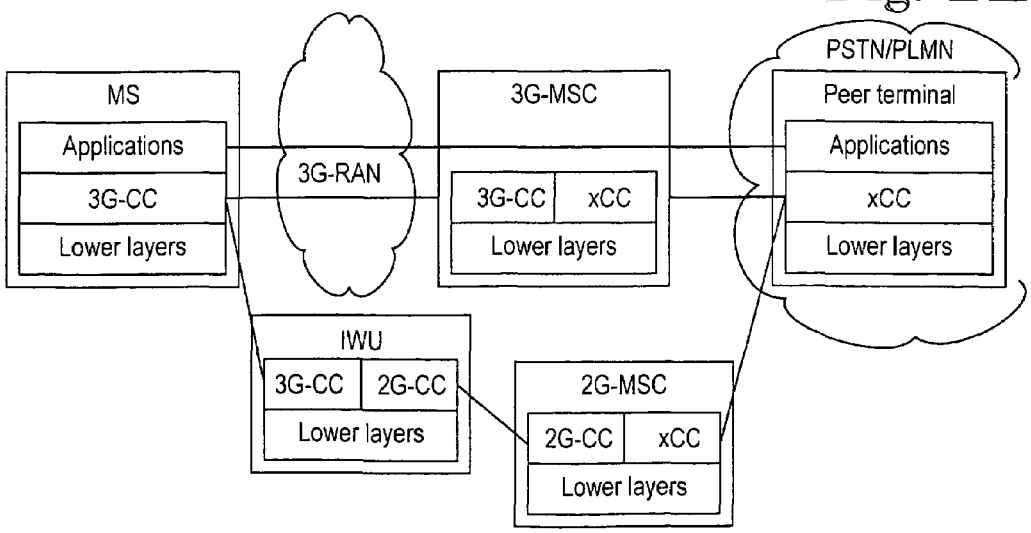

The first operating 3G networks will be based on an interworking concept where in the 3G radio network is connected to a 2G core network via an interworking unit IWU. As far as CC is concerned (and Mobility Management MM), there are two alternatives to implement this concept, basically either a backward compatible approach in which a second generation call control (2G-CC) is used between the MS and the 2G-MSC such that IWU relays 2G-CC messages without further processing and provides interworking only on the lower layers, as shown in FIG. 2A, or a 'full' IWU approach in which the IWU performs mapping between the 3G and 2G messages, as shown in FIG. 2B. The backward compatible approach is possible, since most mobile stations will probably be 3G-2G dual-mode stations, so they will anyway contain the 2G-CC. In the 'true' IWU alternative a single mode 3G mobile only needs the 3G-CC.

In these different system architectures, every mobile station MS must support the 3G (or 2G) call control protocol in the circuit switched mode. The peer entity of the MS call control entity on the network side is the call control functionality in the MSC. In the call control protocol, a dedicated CC entity is defined for each call. Each CC entity is independent of each other and should communicate with the correspondent peer entity. Different CC entities use different transaction identifiers (TI).

As used herein the term bearer refers to a both-way or a one-way and a symmetric or an asymmetric connection between the mobile and the MSC or the peer end the user. In the GSM specifications, the corresponding term to bearer is channel, traffic channel and, in some cases, 'configuration'. Bearer negotiation refers to a procedure for reaching an agreement between the MS and the MSC on the properties of a new bearer or new properties of an existing bearer. The negotiation basically consists of a question and an answer and a request for a bearer with specified properties and a positive or negative acknowledgement. In the GSM, the definition of required bearer properties in a call is carried out by the Bearer Capability information element (BC_IE). In the 3G-CC, the BC_IE has the same role. A bearer is identified by the Bearer Identifier (BID).

A multicall, i.e. several simultaneous and independent calls to one MS, is a central new feature in the 3G. As noted above, a call has CC peer entities in the MS and the MSC, which communicate via L3 CC messages. Each call has one connection whose characteristics are given in a setup message by means of the BC IE. The different calls of one terminal are independent in the MSC. One call can be e.g. a normal speech call, or a fax or a data call. A call can also be part of a multimedia session. The collection and synchronization of all calls forming a multimedia session is carried out by the application in the terminal. Each independent call must have an identifier, such as a transaction identifier (TI) similar to that used in the GSM, for separating L3 CC message sequences of each other. The length of the TI may be one octet, for example, which enables 256 simultaneous calls in one MS.

Figure 3A:
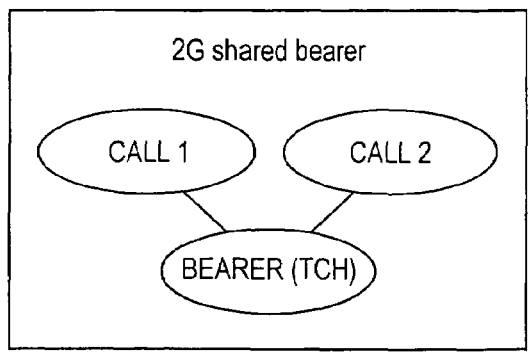
FIGS. 3A, 3B and 3C illustrate a 2G multicall with a shared bearer, a 'pure' 3G multicall with dedicated bearers and a 3G multicall with dedicated and shared bearers, respectively.
Figure 3B:
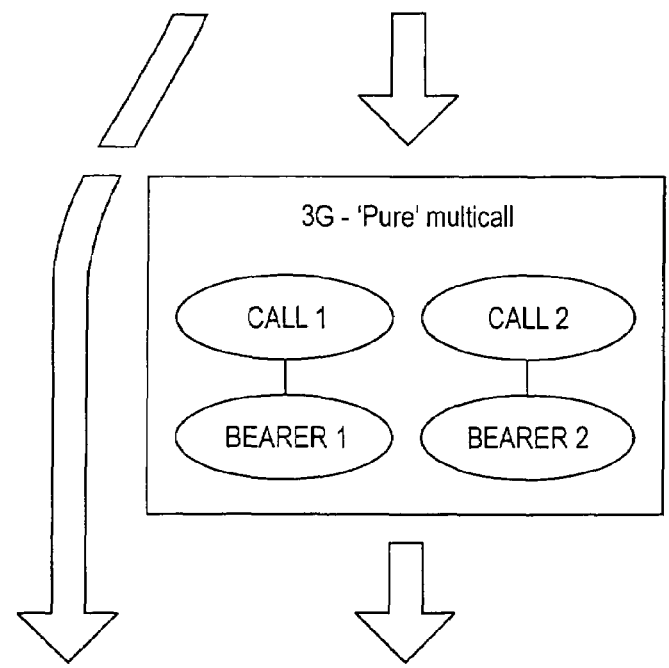

A basic assumption in connection with a 3G multicall has been that each call has one dedicated bearer, i.e. each new call (MO and MT) generates a new bearer, as illustrated in FIG. 3B. Also in the GSM, the L3 protocol architecture allows several parallel calls, the limitation being that there is only one traffic channel, or bearer (in 3G terms), which the different calls share. This is facilitated by the CallHold and Multiparty supplementary services. With CallHold, the calls alternate in using of the traffic channel, and in the Multiparty supplementary service the user data (which is always speech) is summed.

Figure 3C:
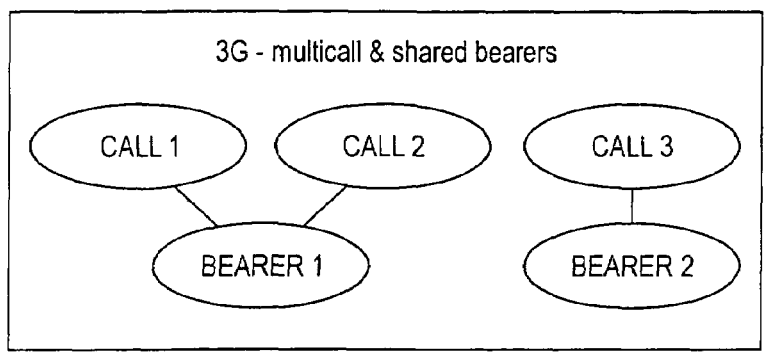

A 3G multicall according to the present invention may have three different bearer configurations: each call of the multicall has a dedicated bearer, or one bearer is shared by all calls of the multicall, or the multicall has both dedicated and shared bearers, as illustrated in FIG. 3C. The "shared" 3G bearer mode may be based on call control procedures which are similar to those used in the GSM for the CallHold supplementary service.

When a shared bearer is used, the user can have several independent calls in parallel which have to alternate in using of the bearer. The sharing may be carried out by means of a call hold mode (CH): when the user puts a call on hold, the traffic bearer is removed from the call to be used as a channel. As a consequence, one of the calls on that bearer is in an active mode and the other call(s) in a hold mode. A user of the subscriber equipment indicates at call setup whether a new dedicated bearer is needed for a new call or whether an existing bearer, and which one, is to be used and shared with one or more existing calls. If an existing bearer is selected, the call(s) which use the bearer to be shared must be put on hold before the new 'sharing' call is initiated. A preferred feature of the invention is that the mobile user is able to control, when the network conditions or circumstances allow, whether a dedicated bearer mode or a shared bearer mode is used for a call. However, at least in some situations, it may be possible that the network may suggest, or even force, the use of either mode. Examples of such a situation include situations wherein a specific parameter or information in the subscriber data or a load situation in the network or at the base station. It is also possible that the network allocates a dedicated bearer to a data call by default, and the user may choose the bearer mode only in the speech call setup. In the latter embodiment, the user may however be able to toggle the data calls between the shared and dedicated bearer modes. It is one preferred feature of the invention that the user is able to toggle the call between the dedicated bearer mode and the shared bearer mode, if desired, i.e. it is possible to change the serving bearer in/during a call.

In the following, some examples are given of bearer negotiations for different call situations in a 3G system according to the present invention, when the bearer mode is primarily selected according to the users' preference.

Mobile Originated (MO) multicall

The basic call setup procedure may be very similar to those used in the 2G systems or proposed for the 3G systems. The following description concentrates only the features which relate to the implementation of the present invention. As normally, the MS may initiate an MO call setup by sending a call setup message SETUP.

In the SETUP message, the user of the mobile station may indicate to the network that a previously allocated bearer can be used instead of allocating a new bearer. The user must then identify the existing bearer which she wants to use by indicating the respective bearer ID in the setup message. If the user wants a new bearer for a call, the bearer ID information element in the SETUP message is empty or contains a predetermined value, such as '1111', or the ID of a bearer which is not currently in use.

When the 3G network (the MSC) receives a call setup message from the mobile station MS and the bearer ID element is empty or '1111', the network (by default) allocates a new bearer for the call. This applies to the first call of the MS. Each allocated bearer is identified by a Bearer ID. The network selects the bearer ID and returns it to the MS in a CALL_PROCEEDING message, for example.

When the network receives a setup message with a bearer ID of an existing bearer, the network allocates this bearer to the call. Any existing call(s) which use(s) the bearer to be shared may be put on hold before the new 'sharing' call is initiated, if this feature is preferred.

The user may release a call from a shared bearer through a call release message which contains the transaction identifier TI of the call. The shared bearer is released when the last call using that bearer is released.

The user is able to toggle the call between the dedicated bearer mode and the shared bearer mode, if desired, i.e. it is possible to change the serving bearer in/during a call.

Changing the 'bearer mode' from 'dedicated bearer' mode to 'shared-bearer' mode and vice versa is needed in various situations, e.g. when the network (or the user) wants to limit (decrease) the number of bearers. This can be carried out by utilizing the existing (in the GSM) MODIFY-procedure, by which the bearer or call properties can be modified (negotiated) during the call. The MODIFY-procedure essentially consists of the modification request, the MODIFY-message, and an acknowledgement, the MODIFY_COMPLETE-message. The change of bearer mode can be implemented by adding the Bearer ID to the MODIFY and the MODIFY_COMPLETE messages. When the user wants to associate the call with an existing bearer, the BID of this bearer is included in the MODIFY-message. If the user wants a new (dedicated) bearer to be allocated for the call, this can be indicated by giving the BID a certain value (e.g. '1111'). In all 'bearer reassociation' cases the MODIFY_COMPLETE-message can contain the result, i.e. the BID of the bearer which is associated with the call.

An alternative way to get a new bearer in a call is to send a setup message. In other words, the user sends a SETUP message with an active TI and an indication that a new bearer is requested, such as the bearer ID '1111'. The network allocates a new bearer and separates the existing call from the shared bearer.

The user is able to put any call on any dedicated or shared bearer on hold by sending a hold activation message HOLD, which contains the transaction identifier TI of the respective call. No bearer ID is required. When the network (e.g. MSC)

receives the HOLD message, the network puts the call identified by the TI on hold, i.e. closes the user information path which relates to that call. It should be noted that when a call is on hold, the CC peer entities of the call in the MS and in the network are maintained although the user information is not transferred. The call can be returned from the hold mode into the active mode by sending a hold deactivation message RETRIEVE which again contains the TI of the respective call.

In any one of the above cases the network may, according to some embodiments of the invention, force or suggest a bearer mode other than that requested by the user if the network conditions or other reason require this.

Mobile Terminated (MT) multicall

The basic call setup procedure may be very similar to those used in the 2G systems or proposed to the 3G systems. The following description only concentrates on the features which relate to the implementation of the present invention. As normally, the 3G network (e.g. MSC) may initiate an MT call setup by sending a call setup message SETUP to the MS. An alternative is to offer a new MT call to the MS having one or more active call by means of a Call Waiting (CW) supplementary service.

The network operator may have certain preferences which it should be able to promote. Therefore, in one embodiment of the invention, the network can indicate or suggest in the incoming SETUP message which bearer is to be used. A new bearer may be indicated by a certain value, such as ('1111').

The MS responses to or acknowledges the SETUP message or the CW by sending some kind of response message(s) in the call setup procedure, such as CALL_CONFIRMED or CONNECT_Ack. Any such response message or other such message can be utilized by the user of the mobile station to indicate to the network that a previously allocated bearer can be used instead of allocating a new bearer, in a similar manner to that described above in connection with the MO call. In other words, the user must identify the existing bearer which the user wants to use by indicating the respective bearer ID in the setup message. If the user wants a new bearer for a call, the bearer ID information element in the SETUP message is empty or contains a predetermined value, such as '1111'.

When the 3G network (e.g. the MSC) receives a message, such as CALL_CONFIRMED, from the mobile station MS and the bearer ID element is empty or '1111', the network (by default) allocates a new bearer to the call.

This applies to the first call of the MS. Each allocated bearer is identified by a Bearer ID. The network selects the bearer ID and returns it to the MS.

When the network receives a message, such as CALL_CONFIRMED, with a bearer ID of an existing bearer, the network associates this bearer with the call. Any existing call(s) which use(s) the bearer to be shared is put on hold before the new 'sharing' call is initiated.

The user may release a call and toggle the call between the dedicated bearer mode and the shared bearer mode as well as between the hold mode and the active mode in a similar manner to that described above in connection with the MO multicall.

In any one of the above cases the network may, according to some embodiments of the invention, force or suggest a bearer mode other than that requested by the user if the network conditions or other reason require this.

3G Multicall Service Interaction with 2G Supplementary Services

A multicall requires that the user should be able to receive calls independently of ongoing calls and to place new calls independently of ongoing calls. This requirement interacts, or interferes, with certain situations occurring in some supplementary services.

The following Supplementary Services (SS) are triggered by 'user busy' condition: Call Waiting (CW), Call Forwarding on Busy (CFU), and Call Completion to Busy Subscriber (CCBS). In addition, the following Supplementary Services involve elements that may interact with a multicall (e.g. a multicall offers the possibility of implementing the service in the MS): Multiparty Call (MPTY), Call Hold (CH), Explicit Call Transfer (ECT).

In the GSM there are two ways to express that the user is busy and cannot receive calls. The User Determined User Busy (UDUB) condition occurs when the user rejects an offered call by responding to the received SETUP message with a CALL_CONFIRMED or RELEASE_COMPLETE message with the cause "user busy". Alternatively, the network (MSC) can determine that the (bearer) resources of the user are occupied, i.e. Network Determined User Busy (NDUB).

The available number of bearers in GSM is one, and NDUB occurs when this one bearer (connection) is occupied. In the 3G there is no definite limit to the number of bearers. The criteria should rather be the ability of the user to handle simultaneous calls than the physical limits of the system.

In an embodiment of the invention, the definition of Network Determined User Busy (NDUB) is changed to state that the maximum number of basic calls (not including Call Waiting calls) is a value N, which can be assigned e.g. on a per network element or a per subscriber basis. In a further embodiment, the maximum number of calls (N) can be given separately for each basic call type. This way it is possible e.g. to limit the number of parallel speech calls to one, but simultaneously have several (CS) data or fax calls active. The user may indicate to the network the NDUP limit and change the limit during the call.

Call Waiting means that an incoming call is offered to a busy user. In the 3G the meaning or role of the CW changes from that in the GSM since a multicall implicitly offers the corresponding functionality. However, since it is a clear requirement that CW should be supported in the 3G, the possible interaction problems between the multicall and the CW have to be considered.

If the shared bearer mode is not used in the multicall and/or the NDUB is unlimited, the CW is not needed for offering a new call.

When the shared bearer mode is used and the NDUB is limited, the network sets up new calls until the number of calls reaches the NDUB. After reaching the NDUB, the network may offer new calls by means of the CW. This is also possible for a busy subscriber. This way, the CW works 'above' the multicall; both the multicall and the CW function as they are expected.

In the 3G, when an incoming CW call is allowed, the maximum number of bearers is already in use. The user must choose (if he has more than one active call) a call to put on hold and accept the new call with the indication which bearer to use. The user may be able to determine on the basis of the received information whether the newly-offered call is a speech call or a data call. If the call is a data call, it is not normally reasonable to put the call on hold.

A 3G multicall enables a multiparty call to be implemented in the MS, i.e. combining the speech paths of separate two 'dedicated bearer' calls in the terminal. This, however, leads to (unnecessary) waste of resources since it maintains two (or more) speech paths over the air.

In the GSM, a multiparty call is initiated from one active and one held call which both share the same bearer. In the 3G, it must be possible to combine at least two 'dedicated bearer' multicalls into a multiparty call. This can be carried out by means of changing one of the calls from a dedicated bearer to share the bearer of the other call according to the principles of the invention such that both calls are in a shared bearer mode, one active and the other one on hold. If the multiparty call is to be established for calls already in the shared bearer mode, this step is naturally omitted. In the shared bearer mode, the Multiparty service can be initiated just like in the GSM (by sending a FACILITY message referring to the TI of either call with a BuildMPTY indicator). As a result, the 2G multiparty call supplementary service can be fully supported in the 3G system.

In the case of 3G-2G dual-mode stations, also intersystem handovers are available which may change the available bearer capabilities and the service level offered by the network. The present invention allows handover of a multicall from a 3G system to a 2G system, such as the GSM. This is achieved by putting all calls (irrespective of whether they have been in a dedicated bearer mode or a shared bearer mode) of the multicall on a common shared bearer prior to the handover. One of the calls is to be active and the other(s) on hold. However, data calls are not normally put on hold but released prior to the handover. The handover of the multicall can thus be carried out in a similar manner to that of internal handover in the 2G system. In the 2G system, the multicall continues on a shared bearer with one call active and the other(s) on hold.

The application has been described above by means of the preferred embodiments in order to illustrate the principles of the invention. The details of the invention may vary within the scope and spirit of the accompanying claims.

The invention claimed is:

1. A method of controlling a multicall in a telecommunications system over a transmission path between a telecommunications network and a subscriber terminal, comprising:
   setting up any new call in an existing multicall over the transmission path between the telecommunications network and the subscriber terminal, when a criterion is met, by setting up said new call on an existing bearer such that said existing bearer is shared by at least two calls of said multicall of said subscriber terminal, instead of by setting up said new call on a new bearer;
   wherein a multicall refers to two or more independent and simultaneous calls to/from the subscriber terminal.

2. A method according to claim 1, wherein a decision whether the new bearer is required or whether said existing bearer is to be used is made by the network according to said criterion.

3. A method according to claim 1, wherein said criterion is a preference of a user of said subscriber terminal.

4. A method according to claim 1, comprising indicating in a call setup signalling which existing bearer is to be used.

5. A method according to claim 4, wherein said indicating comprises indicating in the call setup signalling a bearer ID of the existing bearer to be used.

6. A method according to claim 1, comprising allocating a dedicated bearer to the new call by a default by the network if a user does not indicate in the call setup any existing bearer to be used.

7. A method according to claim 1, comprising changing a call currently being on a shared bearer to use a new dedicated bearer.

8. A method according to claim 1, comprising changing a call currently using a dedicated bearer to use another bearer shared with at least another call.

9. A method as claimed in claim 1, comprising offering a new subscriber-terminal-terminating call to a user by means of a call waiting supplementary service only when a maximum number of the bearers allowed has been used by the multicall.

10. A method of controlling a multicall in a telecommunications system over a transmission path between a telecommunications network and a subscriber terminal, comprising:
    setting up any new call in an existing multicall, when a criterion is met, by setting up said new call on an existing bearer such that said existing bearer is shared by at least two calls, instead of by setting up said new call on a new bearer, and
    indicating in a call setup signalling from said subscriber terminal to said network whether the new bearer is required or whether said existing bearer is to be used;
    wherein a multicall refers to two or more independent and simultaneous calls to/from the subscriber terminal.

11. A method of controlling a multicall in a telecommunications system over a transmission path between a telecommunications network and a subscriber terminal, comprising:
    setting up any new call in an existing multicall over the transmission path between the telecommunications network and the subscriber terminal, according to a criterion, by
    setting up said new call on an existing bearer such that said existing bearer is shared by at least two calls of said multicall of said subscriber terminal, and
    changing a call currently being on a shared bearer to use a new dedicated bearer, wherein said changing comprises:
      (i) sending, from the subscriber terminal to the network, a call setup message containing a transaction identifier of said call currently on the shared bearer and an indication that a new dedicated bearer is requested, and
      (ii) allocating in response to said call setup message, a new dedicated bearer and transferring the call indicated by the transaction identifier received to said allocated bearer by the network;
    wherein a multicall refers to two or more independent and simultaneous calls to/from the subscriber terminal.

12. A method of controlling a multicall in a telecommunications system over a transmission path between a telecommunications network and a subscriber terminal, comprising:
    setting up any new call in an existing multicall over the transmission path between the telecommunications network and the subscriber terminal, according to a criterion, by setting up said new call on an existing bearer such that said existing bearer is shared by at least two calls of said multicall of said subscriber terminal, and
    changing a call currently using a dedicated bearer to use another bearer shared with at least one other call, wherein said changing comprises:
      (i) sending, from the subscriber terminal to the network, a call setup message containing a transaction identifier of said call having the dedicated bearer and a bearer ID indicating the shared bearer to be used, and (ii) transferring, by the network in response to said call setup message, the call indicated by the transaction identifier received to said existing bearer;

wherein a multicall refers to two or more independent and simultaneous calls to/from the subscriber terminal.

13. A method of controlling a multicall in a telecommunications system over a transmission path between a telecommunication network and a subscriber terminal, comprising:

setting up any new call in an existing multicall over the transmission path between the telecommunications network and the subscriber terminal, according to a criterion, by setting up said new call on an existing bearer such that said existing bearer is shared by at least two calls of said multicall of said subscriber terminal, and putting an existing call on an existing bearer of said multicall into a hold mode prior to setting up said new call on said existing bearer;

wherein a multicall refers to two or more independent and simultaneous calls to/from the subscriber terminal.

14. A method according to claim 13, further comprising alternating the calls on a shared bearer between an active mode and said hold mode by a user.

15. A method according to claim 14, wherein said alternating comprises sending a hold message containing a transaction identifier of a call in order to put the respective call on hold.

16. A method of controlling a multicall in a telecommunications system over a transmission path between a telecommunications network and a subscriber terminal, comprising:

offering a new subscriber-terminal-terminating call to a user by means of a call waiting supplementary service, and setting up a new call in an existing multicall over the transmission path between the telecommunications network and the subscriber terminal, according to a criterion, by setting up said new call on an existing bearer such that said existing bearer is shared by at least two calls of said multicall of said subscriber terminal; wherein a multicall refers to two or more independent and simultaneous calls to/from the subscriber terminal.

17. A method of controlling a multicall in a telecommunications system over a transmission path between a telecommunications network and a subscriber terminal, wherein said telecommunications system comprises two telecommunications networks of different generations, the first one of the telecommunications networks supporting both shared bearers and dedicated bearers for a multicall, and the second one of the telecommunications networks supporting only the shared bearers for a multicall, said method comprising:

setting up any new call in an existing multicall over a transmission path between a telecommunications network and a subscriber terminal, when a criterion is met, by setting up said new call on an existing bearer such that said existing bearer is shared by at least two calls of said multicall of said subscriber terminal instead of by setting up said new call on a new bearer, and putting calls of the multicall subjected to an inter-network multicall handover irrespective of whether the calls have been in a dedicated bearer mode or a shared bearer mode, on a common shared bearer in said first network prior to the handover, and carrying out a handover of said multicall onto a shared bearer in said second telecommunications network.

18. A telecommunications system comprising an arrangement for controlling a multicall over a transmission path between a telecommunications network and a subscriber terminal, the network being configured to set up a new call in an existing multicall over the transmission path between the telecommunications network and the subscriber terminal, when a criterion is met, by setting up said new call on an existing bearer such that said existing bearer is shared by at least two calls of said multicall of said subscriber terminal, instead of by setting up said new call on a new bearer; wherein a multicall refers to two or more independent and simultaneous calls to/from the subscriber terminal.

19. A system according to claim 18, wherein a decision whether the new bearer is required or whether said existing bearer is to be used is made by the network according to said criterion.

20. A system according to claim 18, wherein said criterion is a preference of a user of said subscriber terminal.

21. A system according to claim 18, wherein the network is arranged to offer a new subscriber terminal terminating call to a user by a call waiting supplementary service on a shared bearer either always or only when a maximum number of the bearers allowed has been used by the multicall.

22. A telecommunications system comprising an arrangement for controlling a multicall over a transmission path between a telecommunications network and a subscriber terminal, the network being configured to set up a new call in an existing multicall, when a criterion is met, by setting up said new call on an existing bearer such that said existing bearer is shared by at least two calls, instead of by setting up said new call on a new bearer, and wherein a call setup signalling from said subscriber terminal to said network contains an indication whether the new bearer is required or whether said existing bearer is to be used; wherein a multicall refers to two or more independent and simultaneous calls to/from the subscriber terminal.

23. A system comprising an arrangement for controlling a multicall over a transmission path between a telecommunications network and a subscriber terminal, the network being configured to set up a new call in an existing multicall over a transmission path between a telecommunications netowrk and subscriber terminal, when a criterion is met, by setting up said new call on an existing bearer such that said existing bearer is shared by at least two calls of said multicall of said subscriber terminal, instead of by setting up said new call on a new bearer, and wherein said call setup signalling contains an indication which existing bearer is to be used, and wherein the network is arranged to allocate a dedicated bearer to the new call by a default if no indication of any existing bearer to be used is received in said call setup signalling.

24. A telecommunications system comprising an arrangement for controlling a multicall over a transmission path between a telecommunications network and a subscriber terminal, wherein the network is configured to set up a new call in an existing multicall over the transmission path between the telecommunications network and the subscriber terminal, according to a criterion, by setting up said new call on an existing bearer such that said existing bearer is shared by at least two calls of said multicall of said subscriber terminal; and the subscriber terminal is arranged to send to the network a call setup message for changing a call currently being a shared bearer to use a new dedicated bearer, said message containing a transaction identifier of said call and an indication that a new dedicated bearer is requested, and the network is responsive to said call setup message for allocating a new dedicated bearer and transferring the call indicated by the received transaction identifier to said allocated bearer;

wherein a multicall refers to two or more independent and simultaneous calls to/from the subscriber terminal.

25. A system comprising an arrangement for controlling a multicall over a transmission path between a telecommunications network and a subscriber terminal, the network being configured to set up a new call in an existing multicall over a transmission path between a telecommunications network and a subscriber terminal, when a criterion is met, by setting up said new call on an existing bearer such that said existing bearer is shared by at least two calls of said multicall of said subscriber terminal, instead of by setting up said new call on a new bearer, and wherein the subscriber terminal is arranged to send to the network a call setup message for changing a call currently using a dedicated bearer to use another bearer shared with at least another call, said message containing a transaction identifier of said call having the dedicated bearer and a bearer ID indicating the shared bearer to be used, and the network is responsive to said call setup message for transferring the call indicated by the transaction identifier received to said existing bearer.

26. A telecommunications system comprising an arrangement for controlling a multicall over a transmission path between a telecommunications network and a subscriber terminal, the network being configured to set up a new call in an existing multicall over a transmission path between the telecommunications network and the subscriber terminal, according to a criterion, by setting up said new call on an existing bearer such that said existing bearer is shared by at least two calls of said multicall of said subscriber terminal, and the network being further arranged to put an existing call on said existing bearer of said multicall into a hold mode prior to setting up a new call on said bearer;

wherein a multicall refers to two or more independent and simultaneous calls to/from the subscriber terminal.

27. A subscriber terminal for a telecommunications system, said terminal being capable of having a multicall over a transmission path between a telecommunications network and a subscriber terminal, the terminal being configured to be able to indicate at a setup stage of a new call in an existing multicall over the transmission path between the telecommunications network and the subscriber terminal that said new call is set up on an existing bearer; wherein a multicall refers to two or more independent and simultaneous calls to/from the subscriber terminal.

28. A subscriber terminal according to claim 27, wherein said terminal is a mobile station for a mobile communications system.

* * * * *